United States Patent
Fischer et al.

(10) Patent No.: US 8,526,986 B2
(45) Date of Patent: Sep. 3, 2013

(54) OPTIMIZED RANDOM ACCESS CHANNEL (RACH) ACCESS

(75) Inventors: Patrick Fischer, Paris (FR); Remi Feuillette, Paris (FR)

(73) Assignee: LG Electronics Inc., Seoul (KR)

( * ) Notice: Subject to any disclaimer, the term of this patent is extended or adjusted under 35 U.S.C. 154(b) by 1001 days.

(21) Appl. No.: 12/526,035

(22) PCT Filed: Feb. 5, 2008

(86) PCT No.: PCT/KR2008/000734
§ 371 (c)(1),
(2), (4) Date: Aug. 5, 2009

(87) PCT Pub. No.: WO2008/097030
PCT Pub. Date: Aug. 14, 2008

(65) Prior Publication Data
US 2010/0323736 A1 Dec. 23, 2010

Related U.S. Application Data

(60) Provisional application No. 60/900,258, filed on Feb. 7, 2007.

(51) Int. Cl.
*H04B 7/00* (2006.01)

(52) U.S. Cl.
USPC ............ 455/511; 370/470; 370/474; 455/515

(58) Field of Classification Search
USPC ......... 455/502, 511, 514, 515, 517; 370/312, 370/466, 467, 469, 470, 254, 473–475
See application file for complete search history.

(56) References Cited

U.S. PATENT DOCUMENTS

| 4,991,207 | A  | * | 2/1991 | Shiraishi et al. | 380/271 |
| 6,345,044 | B1 | * | 2/2002 | Edgar et al. | 370/338 |
| 6,810,258 | B1 |   | 10/2004 | Vialen | |
| 2002/0003801 | A1 | * | 1/2002 | Hwa et al. | 370/401 |
| 2002/0071480 | A1 |   | 6/2002 | Marjelund et al. | |
| 2002/0111159 | A1 | * | 8/2002 | Faccin et al. | 455/422 |
| 2003/0007510 | A1 | * | 1/2003 | Yeo et al. | 370/469 |
| 2003/0109270 | A1 | * | 6/2003 | Shorty | 455/517 |
| 2003/0139170 | A1 |   | 7/2003 | Heo | |
| 2003/0211846 | A1 | * | 11/2003 | Nagpal et al. | 455/434 |
| 2004/0067735 | A1 | * | 4/2004 | Lobley | 455/41.2 |
| 2004/0117860 | A1 | * | 6/2004 | Yi et al. | 725/147 |
| 2004/0166853 | A1 | * | 8/2004 | Takeda et al. | 455/434 |
| 2004/0224688 | A1 | * | 11/2004 | Fischer | 455/435.1 |
| 2005/0237960 | A1 | * | 10/2005 | Kim | 370/312 |
| 2006/0211417 | A1 | * | 9/2006 | Pedlar | 455/425 |
| 2007/0142043 | A1 | * | 6/2007 | Artola et al. | 455/422.1 |

(Continued)

FOREIGN PATENT DOCUMENTS
EP 1009184 B1 9/2004

*Primary Examiner* — Yuwen Pan
*Assistant Examiner* — Mark Woodall
(74) *Attorney, Agent, or Firm* — Lee, Hong, Degerman, Kang & Waimey

(57) ABSTRACT

A method and apparatus to reduce the overhead related to allocation of the terminal identifier in a random access procedure and an optimized method for detecting a collision are provided. By allocating a "short" terminal identifier in the Random Access Response that is identifiers and allocating the permanent terminal identifier at the end of the random access procedure, the size of data that must be transmitted in the Random Access Response is reduced and power is saved.

8 Claims, 9 Drawing Sheets

(56) References Cited

U.S. PATENT DOCUMENTS

| | | | |
|---|---|---|---|
| 2007/0189236 A1* | 8/2007 | Ranta-aho et al. | 370/335 |
| 2008/0165755 A1* | 7/2008 | Marinier et al. | 370/342 |
| 2012/0026944 A1* | 2/2012 | Yamada et al. | 370/328 |

* cited by examiner

OPTIMIZED RANDOM ACCESS CHANNEL (RACH) ACCESS

CROSS REFERENCE TO RELATED APPLICATIONS

This application is the National Stage filing under 35 U.S.C. §371 of International Application No. PCT/KR2008/000734, filed on Feb. 5, 2008, which claims the benefit of U.S. Provisional Application Ser. No. 60/900,258 filed on Feb. 7, 2007, the contents of both of which are hereby incorporated by reference herein in their entirety.

TECHNICAL FIELD

The present invention is directed to an initial access procedure in a mobile terminal using a Random Access Channel (RACH), and specifically, to a method and apparatus for reducing the overhead related to allocation of the terminal identifier in a random access procedure by allocating a "short" terminal identifier to reduce the size of data that must be transmitted in a Random Access Response message and allocating a permanent terminal identifier at the end of the random access procedure.

BACKGROUND ART

A universal mobile telecommunication system (UMTS) is a European-type, third generation IMT-2000 mobile communication system that has evolved from a European standard known as Global System for Mobile communications (GSM). UMTS is intended to provide an improved mobile communication service based upon a GSM core network and wideband code division multiple access (W-CDMA) wireless connection technology. In December 1998, a Third Generation Partnership Project (3GPP) was formed by the ETSI of Europe, the ARIB/TTC of Japan, the T1 of the United States, and the TTA of Korea. The 3GPP creates detailed specifications of UMTS technology.

In order to achieve rapid and efficient technical development of the UMTS, five technical specification groups (TSG) have been created within the 3GPP for standardizing the UMTS by considering the independent nature of the network elements and their operations. Each TSG develops, approves, and manages the standard specification within a related region. The radio access network (RAN) group (TSG-RAN) develops the standards for the functions, requirements, and interface of the UMTS terrestrial radio access network (UTRAN), which is a new radio access network for supporting W-CDMA access technology in the UMTS.

FIG. 1 provides an overview of a UMTS network. The UMTS network includes a mobile terminal or user equipment (UE) 1, a UTRAN 2 and a core network (CN) 3.

The UTRAN 2 includes several radio network controllers (RNCs) 4 and NodeBs 5 that are connected via the Iub interface. Each RNC 4 controls several NodeBs 5. Each NodeB 5 controls one or several cells, where a cell covers a given geographical area on a given frequency.

Each RNC 4 is connected via the Iu interface to the CN 3 or towards the mobile switching center (MSC) 6 entity of the CN and the general packet radio service (GPRS) support Node (SGSN) 7 entity. RNCs 4 can be connected to other RNCs via the Iur interface. The RNC 4 handles the assignment and management of radio resources and operates as an access point with respect to the CN 3.

The NodeBs 5 receive information sent by the physical layer of the UE 1 via an uplink and transmit data to the UE 1 via a downlink. The Node-Bs 5 operate as access points of the UTRAN 2 for the UE 1.

The SGSN 7 is connected to the equipment identity register (EIR) 8 via the Gf interface, to the MSC 6 via the $G^S$ interface, to the gateway GPRS support node (GGSN) 9 via the $G^N$ interface, and to the home subscriber server (HSS) via the $G^R$ interface.

The EIR 8 hosts lists of UEs 1 that are available for use on the network.

The MSC 6, which controls the connection for circuit switched (CS) services, is connected towards the media gateway (MGW) 11 via the NB interface, towards the EIR 8 via the F interface, and towards the HSS 10 via the D interface.

The MGW 11 is connected towards the HSS 10 via the C interface and also to the public switched telephone network (PSTN). The MGW 11 also allows the codecs to adapt between the PSTN and the connected RAN.

The GGSN 9 is connected to the HSS 10 via the GC interface and to the Internet via the GI interface. The GGSN 9 is responsible for routing, charging and separation of data flows into different radio access bearers (RABs). The HSS 10 handles the subscription data of users.

The UTRAN 2 constructs and maintains an RAB for communication between a UE 1 and the CN 3. The CN 3 requests end-to-end quality of service (QoS) requirements from the RAB and the RAB supports the QoS requirements set by the CN 3. Accordingly, the UTRAN 2 can satisfy the end-to-end QoS requirements by constructing and maintaining the RAB.

The services provided to a specific UE 1 are roughly divided into CS services and packet switched (PS) services. For example, a general voice conversation service is a CS service and a Web browsing service via an Internet connection is classified as a PS service.

The RNCs 4 are connected to the MSC 6 of the CN 3 and the MSC is connected to the gateway MSC (GMSC) that manages the connection with other networks in order to support CS services. The RNCs 4 are connected to the SGSN 7 and the gateway GGSN 9 of the CN 3 to support PS services.

The SGSN 7 supports packet communications with the RNCs. The GGSN 9 manages the connection with other packet switched networks, such as the Internet.

FIG. 2 illustrates a structure of a radio interface protocol between a UE 1 and the UTRAN 2 according to the 3GPP radio access network standards. As illustrated In FIG. 2, the radio interface protocol has horizontal layers comprising a physical layer, a data link layer, and a network layer, and has vertical planes comprising a user plane (U-plane) for transmitting user data and a control plane (C-plane) for transmitting control information. The U-plane is a region that handles traffic information with the user, such as voice or Internet protocol (IP) packets. The C-plane is a region that handles control information for an interface with a network as well as maintenance and management of a call. The protocol layers can be divided into a first layer (L1), a second layer (L2), and a third layer (L3) based on the three lower layers of an open system interconnection (OSI) standard model.

The first layer (L1), or physical layer, provides an information transfer service to an upper layer by using various radio transmission techniques. The physical layer is connected to an upper layer, or medium access control (MAC) layer, via a transport channel. The MAC layer and the physical layer exchange data via the transport channel.

The second layer (L2) includes a MAC layer, a radio link control (RLC) layer, a broadcast/multicast control (BMC) layer, and a packet data convergence protocol (PDCP) layer.

The MAC layer handles mapping between logical channels and transport channels and provides allocation of the MAC parameters for allocation and re-allocation of radio resources. The MAC layer is connected to an upper layer, or the radio link control (RLC) layer, via a logical channel.

Various logical channels are provided according to the type of information transmitted. A control channel is generally used to transmit information of the C-plane and a traffic channel is used to transmit information of the U-plane. A logical channel may be a common channel or a dedicated channel depending on whether the logical channel is shared.

FIG. 3 illustrates the different logical channels that exist. Logical channels include a dedicated traffic channel (DTCH), a dedicated control channel (DCCH), a common traffic channel (CTCH), a common control channel (CCCH), a broadcast control channel (BCCH), and a paging control channel (PCCH), or a Shared Control Channel (SCCH), as well as other channels. The BCCH provides information including information utilized by a UE 1 to access a system. The PCCH is used by the UTRAN 2 to access a UE 1.

Additional traffic and control channels are introduced in the Multimedia Broadcast Multicast Service (MBMS) standard for the purposes of MBMS. The MBMS point-to-multipoint control channel (MCCH) is used for transmission of MBMS control information. The MBMS point-to-multipoint traffic channel (MTCH) is used for transmitting MBMS service data. The MBMS scheduling channel (MSCH) is used to transmit scheduling information.

The MAC layer is connected to the physical layer by transport channels. The MAC layer can be divided into a MAC-b sub-layer, a MAC-d sub-layer, a MAC-c/sh sub-layer, a MAC-hs sub-layer and a MAC-m sublayer according to the type of transport channel being managed.

The MAC-b sub-layer manages a broadcast channel (BCH), which is a transport channel handling the broadcasting of system information. The MAC-c/sh sub-layer manages a common transport channel, such as a forward access channel (FACH) or a downlink shared channel (DSCH), which is shared by a plurality of UEs 1, or in the uplink the radio access channel (RACH). The MAC-m sublayer may handle MBMS data.

FIG. 4 illustrates the possible mapping between the logical channels and the transport channels from a UE 1 perspective. FIG. 5 illustrates the possible mapping between the logical channels and the transport channels from a UTRAN 2 perspective.

The MAC-d sub-layer manages a dedicated channel (DCH), which is a dedicated transport channel for a specific UE 1. The MAC-d sublayer is located in a serving RNC 4 (SRNC) that manages a corresponding UE 1. One MAC-d sublayer also exists in each UE 1.

The RLC layer supports reliable data transmissions and performs segmentation and concatenation on a plurality of RLC service data units (SDUs) delivered from an upper layer depending of the RLC mode of operation. The RLC layer adjusts the size of each RLC SDU received from the upper layer in an appropriate manner based upon processing capacity and then creates data units by adding header information. The data units, or protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the CN 3. The BMC layer broadcasts the CB message to UEs 1 positioned in a specific cell or cells.

The PDCP layer is located above the RLC layer. The PDCP layer is used to transmit network protocol data, such as the IPv4 or IPv6, efficiently on a radio interface with a relatively small bandwidth. The PDCP layer reduces unnecessary control information used in a wired network, a function called header compression, for this purpose.

The radio resource control (RRC) layer located at the lowest portion of the third layer (L3) is only defined in the C-plane. The RRC layer controls the transport channels and the physical channels in relation to setup, reconfiguration, and the release or cancellation of the radio bearers (RBs).

A RB signifies a service provided by the second layer (L2) for data transmission between a UE 1 and the UTRAN 2. The set up of the RB generally refers to the process of stipulating the characteristics of a protocol layer and a channel required for providing a specific data service and setting the respective detailed parameters and operation methods. The RRC also handles user mobility within the RAN and additional services, such as location services.

Not all different possibilities for the mapping between the RBs and the transport channels for a given UE 1 are available all the time. The UE 1/UTRAN 2 deduce the possible mapping depending on the UE state and the procedure presently executed by the UE/UTRAN.

The different transport channels are mapped onto different physical channels. The configuration of the physical channels is given by RRC signaling exchanged between the RNC 4 and the UE 1.

Initial access is a procedure whereby a UE 1 sends a first message to the UTRAN 2 using a common uplink channel, specifically the Random Access Channel (RACH). For both GSM and UMTS systems, the initial access procedure involves the UE 1 transmitting a connection request message that includes a reason for the request and receiving a response from the UTRAN 2 indicating the allocation of radio resources for the requested reason.

There are several reasons, or establishment causes, for sending a connection request message. Table I indicates the establishment causes specified in UMTS, specifically in 3GPP TS 25.331.

TABLE 1

| Establishment Causes |
| --- |
| Originating Conversational Call |
| Originating Streaming Call |
| Originating Interactive Call |
| Originating Background Call |
| Originating Subscribed traffic Call |
| Terminating Conversational Call |
| Terminating Streaming Call |
| Terminating Interactive Call |
| Terminating Background Call |
| Emergency Call |
| Inter-RAT cell re-selection |
| Inter-RAT cell change order |
| Registration |
| Detach |
| Originating High Priority Signaling |
| Originating Low Priority Signaling |
| Call re-establishment |
| Terminating High Priority Signaling |
| Terminating Low Priority Signaling |

The "originating call" establishment cause indicates that the UE 1 wants to setup a connection, for example, a speech connection. The "terminating call" establishment cause indicates that that UE 1 answers to paging. The "registration" establishment cause indicates that that the user wants to register only to the network.

A physical random access procedure is used to send information over the air. The physical random access transmission is under control of a higher layer protocol, which performs important functions related to priority and load control. This procedure differs between GSM and UMTS radio systems.

The description of GSM random access procedure can be found in "The GSM System for Mobile Communications" published by M. Mouly and M. B. Pautet, 1992. As the present invention is related to UMTS enhancement and evolution, the W-CDMA random access procedure is detailed herein. Although the present invention is explained in the context of UMTS evolution, the present invention is not so limited.

The transport channel RACH and two physical channels, Physical Random Access Channel (PRACH) and Acquisition Indication Channel (AICH), are utilized in this procedure. The transport channels are channels supplied by the physical layer to the protocol layer of the MAC layer. There are several types of transport channels to transmit data with different properties and transmission formats over the physical layer.

Physical channels are identified by code and frequency in Frequency Division Duplex (FDD) mode and are generally based on a layer configuration of radio frames and timeslots. The form of radio frames and timeslots depends on the symbol rate of the physical channel.

A radio frame is the minimum unit in the decoding process, consisting of 15 time slots. A time slot is the minimum unit in the Layer 1 bit sequence. Therefore, the number of bits that can be accommodated in one time slot depends on the physical channel.

The transport channel RACH is an uplink common channel used for transmitting control information and user data. The transport channel RACH is utilized in random access and used for low-rate data transmissions from a higher layer. The RACH is mapped to an uplink physical channel, specifically the PRACH. The AICH is a downlink common channel, which exists as a pair with PRACH used for random access control.

The transmission of PRACH is based on a slotted ALOHA approach with fast acquisition indication. The UE randomly selects an access resource and transmits a RACH preamble part of a random access procedure to the network.

A preamble is a short signal that is sent before the transmission of the RACH connection request message. The UE 1 repeatedly transmits the preamble by increasing the transmission power each time the preamble is sent until it receives the Acquisition Indicator (AI) on AICH, which indicates the detection of the preamble by the UTRAN 2. The UE 1 stops the transmission of the preamble once it receives the AI and sends the message part at the power level equal to the preamble transmission power at that point, adding an offset signaled by the UTRAN 2. FIG. 6 illustrates a power ramping procedure.

This random access procedure avoids a power ramping procedure for the entire message. A power ramping procedure would create more interference due to unsuccessfully sent messages and would be less efficient due to a larger delay since it would take much more time to decode the message before an acknowledgement could be transmitted to indicate successful receipt of the message.

The main characteristics of the RACH is that it is a contention based channel subject to collisions due to simultaneous access of several users, which may preclude decoding of the initial access message by the network. The UE 1 can start the random access transmission of both preambles and message only at the beginning of an access slot. This access method is, therefore, a type of slotted ALOHA approach with fast acquisition indication The time axis of both the RACH and the AICH is divided into time intervals or access slots. There are 15 access slots per two frames, with each frame having a length of 10 ms or 38400 chips, and the access slots are spaced 1.33 ms or 5120 chips apart. FIG. 7 illustrates the number and spacing of access slots.

The UTRAN 2 signals information regarding which access slots are available for random access transmission and the timing offsets to use between RACH and AICH, between two successive preambles and between the last preamble and the message. For example, if the AICH transmission timing is 0 and 1, it is sent three and four access slots after the last preamble access slot transmitted, respectively. FIG. 8 illustrates the timing of the preamble, AI and message part The timing at which the UE 1 can send the preamble is divided according to random access sub channels. A random access sub channel is a subset including the combination of all uplink access slots. There are 12 random access sub channels. A random access sub channel consists of the access slots indicated in Table II.

TABLE 2

| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 8 | 9 | 10 | 11 | 12 | 13 | 14 | | | |
| 6 | 3 | 4 | 5 | 6 | 7 | | | | | 0 | 1 | 2 |
| 7 | | | | | | 8 | 9 | 10 | 11 | 12 | 13 | 14 |

The preamble is a short signal that is sent before the transmission of the RACH message. A preamble consists of 4096 chips, which is a sequence of 256 repetitions of Hadamard codes of length 16 and scrambling codes assigned from the upper layer.

The Hadamard codes are referred to as the signature of the preamble. There are 16 different signatures and a signature is randomly selected from available signature sets on the basis of Access Service Classes (ASC) and repeated 256 times for each transmission of the preamble part. Table III lists the preamble signatures.

The message part is spread by Orthogonal Variable Spreading Factor (OVSF) codes that are uniquely defined by the preamble signature and the spreading codes for use as the preamble signature. The 10 ms long message part radio frame is divided into 15 slots, each slot consisting of 2560 chips.

TABLE 3

| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |

Each slot includes a data part and a control part that transmits control information, such as pilot bits and TFCI. The data part and the control part are transmitted in parallel. The 20 ms long message part consists of two consecutive message part radio frames. The data part consists of 10*2 k bits, where k=0, 1, 2, 3, which corresponds to a Spreading Factor (SF) of 256, 128, 64, 32. FIG. 9 illustrates the structure of the random access message part.

The AICH consists of a repeated sequence of 15 consecutive access slots, each slot having a length of 40 bit intervals or 5120 chips. Each access slot includes two parts, an Acquisition Indicator (AI) part consisting of 32 real-valued signals, such as a0 . . . a31, and a part having a length of 1024 chips during which transmission is switched off. FIG. 10 illustrates the structure of the AICH.

When the UTRAN 2 detects transmission of a RACH preamble having a certain signature in an RACH access slot, the UTRAN repeats this signature in the associated AICH access slot. Therefore, the Hadamard code used as the signature for the RACH preamble is modulated onto the AI part of the AICH.

The acquisition indicator corresponding to a signature can have a value of +1, -1 or 0 depending on whether a positive acknowledgement (ACK), a negative acknowledgement (NACK) or no acknowledgement is received in response to a specific signature. The positive polarity of the signature indicates that the preamble has been acquired and the message can be sent.

The negative polarity indicates that the preamble has been acquired and the power ramping procedure shall be stopped, but the message shall not be sent. This negative acknowledgement is used when a received preamble cannot be processed at the present time due to congestion in the UTRAN 2 and the UE 1 must repeat the access attempt some time later.

All UEs 1 are members of one of ten randomly allocated mobile populations, defined as Access Classes (AC) 0 to 9. The population number is stored in the Subscriber Identity Module (SIM)/Universal Subscriber Identity Module (USIM). UEs 1 may also be members of one or more out of 5 special categories of Access Classes 11 to 15, which are allocated to specific high priority users and the information also stored in the SIM/USIM. Table IV lists the special AC and their allocation.

TABLE 4

| AC | Allocation |
|---|---|
| 15 | PLMN Staff |
| 14 | Emergency Services |
| 13 | Public Utilities (e.g. water/gas suppliers) |
| 12 | Security Services |
| 11 | For PLMN Use |

The UTRAN 2 performs the random access procedure at protocol layer L2 by determining whether to permit the UE 1 to use a radio access resource based primarily upon the AC to which the UE belongs.

It will be desirable to prevent UE 1 users from making access attempts, including emergency call attempts, or responding to pages in specified areas of a Public Land Mobile Network (PLMN) under certain circumstances. Such situations may arise during states of emergency or where 1 or more co-located PLMNs has failed. Broadcast messages should be available on a cell-by-cell basis to indicate the class(es) of subscribers barred from network access. The use of this facility allows the network operator to prevent overload of the access channel under critical conditions Access attempts are allowed if the UE 1 is a member of at least one AC that corresponds to the permitted classes as signaled over the air interface and the AC is applicable in the serving UTRAN 2. Access attempts are otherwise not allowed. Any number of these AC may be barred at any one time. Access Classes are applicable as indicated in Table V.

TABLE 5

| AC | Applicability |
|---|---|
| 0-9 | Home and Visited PLMNs |
| 11 and 15 | Home PLMN only |
| 12, 13, 14 | Home PLMN and visited PLMNs of home country only |

An additional control bit for AC 10 is also signaled over the air interface to the UE 1. This control bit indicates whether access to the UTRAN 2 is allowed for Emergency Calls for UEs 1 with access classes 0 to 9 or without an International Mobile Subscriber Identity (IMSI). Emergency calls are not allowed if both AC 10 and the relevant AC, 11 to 15 are barred for UEs 1 with access classes 11 to 15. Emergency calls are otherwise allowed.

The AC are mapped to ASC In the UMTS. There are eight different priority levels defined, specifically ASC 0 to ASC 7, with level 0 representing the highest priority.

Access Classes shall only be applied at initial access, such as when sending an RRC Connection Request message. A mapping between AC and ASC shall be indicated by the information element "AC-to-ASC mapping" in System Information Block type 5. The correspondence between AC and ASC is indicated in Table VI.

TABLE 6

| AC  | 0-9    | 10     | 11     | 12     | 13     | 14     | 15     |
|-----|--------|--------|--------|--------|--------|--------|--------|
| ASC | $1^{st}$ IE | $2^{nd}$ IE | $3^{rd}$ IE | $4^{th}$ IE | $5^{th}$ IE | $6^{th}$ IE | $7^{th}$ IE |

In Table VI, "nth IE" designates an ASC number i in the range 0-7 to AC. The UE 1 behavior is unspecified if the ASC indicated by the "nth IE" is undefined.

The parameters implied by the respective ASC are utilized for random access. A UE 1 that is a member of several ACs selects the ASC for the highest AC number. The AC is not applied in connected mode.

An ASC consists of a subset of RACH preamble signatures and access slots that are allowed for the present access attempt and a persistence value corresponding to a probability, $Pv \leq 1$, to attempt a transmission. Another important mechanism to control random access transmission is a load control mechanism that reduces the load of incoming traffic when the collision probability is high or when the radio resources are low.

The physical layer (L1) random access procedure is initiated upon request from the MAC sub layer (L2). The physical layer receives information from a higher layer, specifically the RRC, before the physical random-access procedure is initiated and receives information from a higher layer, specifically the MAC, at each initiation of the physical random access procedure. The information is indicated in Table VII. The physical layer random-access procedure is illustrated in FIG. 11.

As illustrated in FIG. 11, one access slot in the random access subchannel that can be used for the given ASC is randomly selected from access slots that can be used in the next full access slot sets (S200). One access slot is randomly chosen from access slots that can be used in the next full access slot sets if there are no access slots available. One signature is then randomly selected from the set of available signatures within the given ASC (S210).

TABLE 7

Information Related to Physical Random-Access Procedure

| Before Initiation of Procedure | Upon Initiating Procedure |
|---|---|
| Preamble scrambling code. | Transport Format for PRACH message part. |
| Message length in time (10 or 20 ms) | ASC of the PRACH transmission |
| AICH_Transmission_Timing parameter (0 or 1) | Data to be transmitted (Transport Block Set) |
| Set of available signatures and set of available RACH sub-channels for each Access Service Class (ASC). | |
| Power-ramping factor Power Ramp Step (integer > 0) | |
| Preamble Retrans Max parameter (integer > 0) | |
| Initial preamble power (Preamble_Initial_Power) | |
| Power offset in dB between power of the last transmitted preamble and power of the control part of the random-access message | |

TABLE 7-continued

Information Related to Physical Random-Access Procedure

| Before Initiation of Procedure | Upon Initiating Procedure |
|---|---|
| ($P_{p-m} = P_{message-control} - P_{preamble}$ measured) Set of Transport Format parameters (including power offset between the data part and the control part of the random-access message for each Transport Format) | |

The preamble retransmission counter is set at Preamble Retrans Max (S220), which is the maximum number of preamble retransmission attempts. The preamble transmission power is set at Preamble Initial Power (S230), which is the initial transmission power of the preamble. The preamble is then transmitted according to the chosen uplink access slot, signature and set transmission power (S240).

The UE 1 then determines whether the UTRAN 2 detected the preamble (S250). No random access message is transmitted if a NACK is detected in the downlink access slot corresponding to the selected uplink access slot. A random access message is transmitted if an ACK is detected in the downlink access slot corresponding to the selected uplink access slot. The preamble is retransmitted if no response, specifically neither an ACK nor a NACK for the selected signature, is detected in the downlink access slot corresponding to the selected uplink access slot.

When no response is received, the next available access slot is selected from the random access subchannel within the given ASC (S260), a new signature is randomly selected from the available signatures within the given ASC (S270), the preamble transmission power is increased by the step width of the power ramping (Power Ramp Step) (S280) and the preamble retransmission counter is reduced by 1 (S290). The UE 1 then determines if the maximum number of retransmissions have been attempted (S300). This preamble re-transmission procedure is repeated for as long as the preamble retransmission counter exceeds 0 and no response is received. The MAC is informed that no ACK was received on AICH (S310) and the physical layer random access procedure is terminated once the retransmission counter reaches 0.

If an ACK is received, the transmission power of the control channel of the random access message is set at a level higher than the transmission power of the last preamble transmitted according to a power offset (S320) and the random access message is transmitted 3 or 4 uplink access slots after the uplink access slot of the last transmitted preamble depending on the AICH transmission timing parameter (S330). The higher layer is then informed of the receipt of the ACK and transmission of the random access message (S340) and the physical layer random access procedure is terminated.

If a NACK is received, no random access message is transmitted and no re-transmission of the preamble is performed. The MAC is informed that a NACK was received (S350) and the physical layer random access procedure is terminated.

FIG. 12 illustrates a signaling establishment procedure between a UE 1 and UTRAN 2. As illustrated in FIG. 12, the RRC Connection Request message is transmitted once the PRACH power control preambles have been acknowledged (S400). The RRC Connection Request message includes a reason for requesting the connection.

The UTRAN 2 determines which resources to reserve and performs synchronization and signaling establishment among radio network nodes, such as a NodeB 5 and serving RNC 4, depending on the request reason (S410). The UTRAN 2 then transmits the Connection Setup message to the UE 1, thereby conveying information about radio resource to use (S420).

The UE 1 confirms connection establishment by sending the Connection Setup Complete message to the UTRAN 2 (S430). The UE 1 transmits the Initial Direct Transfer message to the UTRAN 2 once the connection has been established (S440). The Initial Direct Transfer message includes information such as the UE identity, UE current location and the kind of transaction requested.

Authentication is then performed between the UE 1 and UTRAN 2 and security mode communication is established (S450). The actual set up information is delivered to the UTRAN 2 from the UE 1 via the Call Control Setup message (S460). The Call Control Setup message identifies the transaction and indicates the QoS requirements.

The UTRAN 2 initiates activities for radio bearer allocation by determining if there are sufficient resources available to satisfy the requested QoS and transmits the Call Control Complete message to the UE 1 (S470). The radio bearer is allocated according to the request if there are sufficient resources available. The UTRAN 2 may select either to continue allocation with a lowered QoS value, queue the request until sufficient radio resources become available or reject the call request if sufficient resources are not presently available.

FIG. 13 illustrates the architecture of an LTE system. Each aGW 115 is connected to one or several access Gateways (aGW) 115. An aGW 115 is connected to another Node (not shown) that allows access to the Internet and/or other networks, such as GSM, UMTS, and WLAN.

The 3G LTE requires reduced cost per bit, increased service availability, flexible use of a frequency band, a simple structure, an open interface, and adequate power consumption of a terminal as an upper-level requirement. Generally, The UTRAN 2 corresponds to E-UTRAN (Evolved-UTRAN). The NodeB 5 and/or RNC 4 correspond to e-NodeB (eNB) in the LTE system.

Hybrid ARQ (HARQ) allows optimizing the use of re-transmitted packets. The principle of HARQ is that the receiver indicates to the transmitter whether or not the decoding of a packet was successful. The transmitter re-transmits the same data when the decoding was not successful such that the receiver can combine the earlier received packet with the newly received packet. The re-transmitted data may be coded in a different way. Therefore, HARQ re-uses the information of the earlier received packet in order to decode the transmitted data HARQ implies that the transmitter indicates on a first shared control channel to which receiver a transmission is intended if the channel is shared, as is proposed for LTE or as is done in UMTS with the High Speed Downlink Packet Access (HSDPA) channel. Each UE 1 is assigned a unique Cell Radio Network Temporary Identifier (C-RNTI) for normal operation in order to identify different users on the shared control channel (SCCH).

Information received on the SCCH indicates whether the transmission is a first transmission or whether the transmission is related to an earlier unsuccessful transmission, and possibly to which earlier transmission a re-transmission is related. The control information further indicates other information, such as coding schemes, redundancy versions and resources used for the transmission.

The receiver detects that it is the intended target for a transmission it has received based on the control information and receives the packet. If applicable, the receiver combines the received packets and decodes the message.

The random access procedure is outlined in FIG. 14 and includes four steps. The procedure is initiated for different reasons, such as to contact the eNB to trigger a first transmission, to receive timing alignment of the UE 1 uplink transmission with the time reference in the eNB, and to request uplink transmission.

In the first step illustrated in FIG. 14, the UE 1 selects a Random Access Preamble on RACH and transmits the selected preamble in uplink message 1. The preamble is selected from of one or several sets of possible preambles based on two factors. The first factor is the cause of the access or size of information to transmit, potentially with priority. The second factor is pathloss or channel quality indication (CQI), which indicates the uplink and downlink channel quality measurements, in order to allocate uplink resources appropriately.

In the second step illustrated in FIG. 14, the network transmits a Random Access Response (message 2) to the UE 1 when the network has detected the preamble. The UE 1 will restart the random access procedure at step 1 if message 2 is not received within a certain time.

The transmission of message 2 in the downlink is semi-synchronous with the transmission of message 1 in step 1 in that it occurs within a flexible window of which the size is one or more transmission time intervals (TTI). No HARQ is used for the transmission of message 2, which is transmitted on a layer L1/L2 DL-SCH and addressed with the Random Access Radio Network Temporary Identifier (RA-RNTI) on the L1/L2 control channel.

Message 2 is intended for one or more UEs 1 in one DL-SCH message and conveys at least the Random Access (RA) preamble identifier, timing alignment information, initial uplink grant and assignment of a temporary C-RNTI. The temporary C-RNTI may be made permanent upon the Contention Resolution of message 4. The temporary C-RNTI is not unique and may be used by several UEs 1 if more than one UE simultaneously transmit the preamble message 1 in step 1.

A C-RNTI is an identifier that provides a unique UE 1 identification at the cell level, which is normally 16 bits, in order to identify an RRC connection between the UE and the network. The UE 1 will have to change its C-RNTI when changing a cell.

In the third step illustrated in FIG. 14, the transmission of message 3 on UL-SCH is the first scheduled uplink transmission, such as an RRC Connection Request for initial access. HARQ is used for the transmission of message 3, which is generated at the RLC layer with no segmentation.

Message 3 has a dynamic size and conveys at least a UE identifier, such as a private C-RNTI if available, International Mobile Equipment Identifier (IMEI), Temporary Mobile Subscriber Identifier (TMSI), or International Mobile Subscriber Identifier (IMSI) message or information facilitating formation of the initial Non-Access Stratum (NAS) message in the eNB 105 may be included in a message 3 transmitted for initial access if the message 3 size allows it.

In the fourth step illustrated in FIG. 14, message 4 is transmitted on DL-SCH for Contention Resolution, or RRC Contention Resolution for initial access. Message 4 is addressed to the temporary C-RNTI on the L1/L2 control channel at least for initial access and the transmission of message 4 is not synchronized with message 3.

The transmission of message 4 supports HARQ. HARQ feedback is transmitted only by the UE 1, which detects its own UE identity provided in message 3 and which is echoed in the RRC Contention Resolution message 4. The use of C-RNTI, HARQ and the related consequences, such as a delay impact on other UEs 1 in conjunction with HARQ, are possible for a UE in the RRC_CONNECTED state when message 4 is transmitted.

The UE 1 may consider that the access procedure is successful and determine that the timing advance, the temporary C-RNTI and the contents of message 4 are intended for it if the UE detects its UE identity as provided in message 3. The UE 1 discards information received in message 4 and restarts the initial access procedure if the UE does not correctly detect its UE identity in message 4.

FIG. 15 illustrates the assigning of the temporary C-RNTI using the RA-RNTI, which is a special C-RNTI reserved for the transmission of message 2. As illustrated in FIG. 15, the RA ?RNTI as well as other information is transmitted via the SCCH channel. The UE 1 then decides to receive the DL-SCH and will receive the temporary C-RNTI for later use if the reference to the signature corresponds to the signature used by the UE.

The temporary identifier included in message 2 normally represents 16 bits of information. However it is very costly to transmit this information because it has to be sent over the complete coverage area.

Contention in message 4 is detected by comparing the initial UE identifier in message 2 with the initial UE identity used in message 4. If two UEs 1 use two different identifiers, such that one UE uses the C-RNTI and another UE uses the TIMSI, it is possible that the C-RNTI used by the first UE and the TIMSI used by the other UE have the same value.

DISCLOSURE OF INVENTION

Technical Solution

In one aspect of the present invention, a method of establishing a communication link between a mobile terminal and a network is provided. The method includes requesting access to the network, receiving a response acknowledging receipt of the access request, the response including resources for accessing the network and information related to a mobile terminal identifier and forming a mobile terminal identifier by adding to the information.

It is contemplated that forming the mobile terminal identifier comprises adding to the information such that the mobile terminal identifier is longer than the information. It is further contemplated that the information comprises the LSB of the mobile terminal identifier. Preferably, the method further includes transmitting data using the mobile terminal identifier.

In another aspect of the present invention, a method of establishing a communication link between a mobile terminal and a network is provided. The method includes receiving a request for access to the network and transmitting a response acknowledging receipt of the access request, the response including resources for accessing the network and information related to a mobile terminal identifier and receiving data including a mobile terminal identifier formed by adding to the information.

It is contemplated that the method further includes selecting a mobile terminal identifier and determining the information according to the selected mobile terminal identifier. It is further contemplated that the information comprises the LSB of the selected mobile terminal identifier.

In another aspect of the present invention, a method of establishing a communication link between a mobile terminal and a network is provided. The method includes receiving an indication of a cell-specific mobile terminal identifier, requesting access to the network, receiving a response acknowledging receipt of the access request, the response including resources for accessing the network and a temporary mobile terminal identifier, transmitting a data message using the resources, the data message including the cell-specific mobile terminal identifier and requesting access to the network again if a message addressed using the cell-specific mobile terminal identifier is not received within a specified period of time.

It is contemplated that the response acknowledging receipt of the access request is addressed using a common access identifier. It is further contemplated that the data message is addressed using a temporary mobile terminal identifier.

It is contemplated that the data message further comprises a cell-specific mobile terminal identifier type. It is further contemplated that the mobile terminal-specific mobile terminal identifier comprises a private C-RNTI.

In another aspect of the present invention, a method of establishing a communication link between a mobile terminal and a network is provided. The method includes receiving a request for access to the network, transmitting a response acknowledging receipt of the access request, the response including resources for accessing the network and a temporary mobile terminal identifier, receiving a data message sent using the resources, the data message including a mobile terminal identifier and a mobile terminal identifier type, transmitting a message addressed using the mobile terminal identifier only if the mobile terminal identifier type is a specified type.

It is contemplated that the response acknowledging receipt of the access request is addressed using a common access identifier. It is further contemplated that the data message is addressed using a temporary mobile terminal identifier. Preferably, the specified type is C-RNTI.

In another aspect of the present invention, a method of establishing a communication link between a mobile terminal and a network is provided. The method includes requesting access to the network, receiving a response acknowledging receipt of the access request, the response including resources for accessing the network and a first mobile terminal identifier, transmitting a data message using the resources, the data message including a second mobile terminal identifier and second mobile terminal identifier type, requesting access to the network again if a message addressed using the second mobile terminal identifier and second mobile terminal identifier type is not received within a specified period of time. Preferably, the second mobile terminal identifier comprises a UE Id and the second mobile terminal identifier type indicates one of 'TMSI', 'IMEI' and 'IMSI'.

In another aspect of the present invention, a method of establishing a communication link between a mobile terminal and a network is provided. The method includes receiving a request for access to the network, transmitting a response acknowledging receipt of the access request, the response including resources for accessing the network and a first mobile terminal identifier, receiving a data message using the resources, the data message including a second mobile terminal identifier and second mobile terminal identifier type, transmitting a message, the message including the second mobile terminal identifier and the second mobile terminal identifier type only if the second mobile terminal identifier type is the specified type. Preferably, the second mobile terminal identifier comprises a UE Id and the second mobile terminal identifier type indicates one of 'C-RNTI', TMSI', 'IMEI' and 'IMSI'.

In another aspect of the present invention, a mobile terminal for establishing a communication link between the mobile terminal and a network is provided. The mobile terminal includes a transmitting unit transmitting a request for access to the network, a receiving unit receiving a response acknowledging receipt of the access request, the response including resources for accessing the network and information related to a mobile terminal identifier, a display unit displaying information, an input unit receiving inputs from a user and a processing unit forming a mobile terminal identifier by adding to the information.

It is contemplated that the processing unit forms the mobile terminal identifier by adding to the information such that the mobile terminal identifier is longer than the information. It is further contemplated that the information comprises the LSB of the mobile terminal identifier. Preferably, the processing unit controls the transmitting unit to transmit data using the mobile terminal identifier.

In another aspect of the present invention, a network for establishing a communication link with a mobile terminal is provided. The network includes a receiver receiving a request for access to the network, a transmitter transmitting a response acknowledging receipt of the access request, the response including resources for accessing the network and information related to a mobile terminal identifier and a controller processing data including a mobile terminal identifier formed by adding to the information.

It is contemplated that the controller further selects a mobile terminal identifier and determines the information according to the selected mobile terminal identifier. It is further contemplated that the information comprises the LSB of the selected mobile terminal identifier.

In another aspect of the present invention, a mobile terminal for establishing a communication link between the mobile terminal and a network is provided. The mobile terminal includes a receiving unit receiving an indication of a cell-specific mobile terminal identifier, a transmitting unit transmitting a request for access to the network, a display unit displaying information, an input unit receiving inputs from a user and a processing unit processing a received response acknowledging receipt of the access request, the response including resources for accessing the network and a temporary mobile terminal identifier, controlling the transmitting unit to transmit a data message using the resources, the data message including the cell-specific mobile terminal identifier and controlling the transmitting unit to request access to the network again if a message addressed using the cell-specific mobile terminal identifier is not received within a specified period of time.

It is contemplated that the response acknowledging receipt of the access request is addressed using a common access identifier. It is further contemplated that the processing unit addresses the data message using a temporary mobile terminal identifier.

It is contemplated that the data message further comprises a cell-specific mobile terminal identifier type. It is further contemplated that the cell-specific mobile terminal identifier comprises a private C-RNTI.

In another aspect of the present invention, a network for establishing a communication link with a mobile terminal is provided. The network includes a receiver receiving a request for access to the network, a transmitter transmitting a response acknowledging receipt of the access request, the response including resources for accessing the network and a temporary mobile terminal identifier and a controller processing a data message sent using the resources, the data message including a mobile terminal identifier and a mobile terminal identifier type, and controlling the transmitting unit to transmit a message addressed using the mobile terminal identifier only if the mobile terminal identifier type is a specified type.

It is contemplated that controller addresses the response acknowledging receipt of the access request using a common access identifier. It is further contemplated that the data message is addressed using a temporary mobile terminal identifier. Preferably, the specified type is C-RNTI.

In another aspect of the present invention, a mobile terminal for establishing a communication link between the mobile terminal and a network is provided. The mobile terminal includes a transmitting unit transmitting a request for access to the network, a receiving unit receiving a response acknowledging receipt of the access request, the response including resources for accessing the network and a first mobile terminal identifier, a display unit displaying information, an input unit receiving inputs from a user and a processing unit controlling the transmitting unit to transmit a data message using the resources, the data message including a second mobile terminal identifier and second mobile terminal identifier type, and controlling the transmitting unit to request access to the network again if a message addressed using the second mobile terminal identifier and second mobile terminal identifier type is not received within a specified period of time. Preferably, the second mobile terminal identifier comprises a UE Id and the second mobile terminal identifier type indicates one of 'TMSI', 'IMEI' and 'IMSI'.

In another aspect of the present invention, a network for establishing a communication link with a mobile terminal is provided. The network includes a receiver receiving a request for access to the network, a transmitter transmitting a response acknowledging receipt of the access request, the response including resources for accessing the network and a first mobile terminal identifier and a controller processing a data message sent using the resources, the data message including a second mobile terminal identifier and second mobile terminal identifier type, and controlling the transmitting unit to transmit a message, the message including the second mobile terminal identifier and the second mobile terminal identifier type only if the second mobile terminal identifier type is the specified type. Preferably, the second mobile terminal identifier comprises a UE Id and the second mobile terminal identifier type indicates one of 'C-RNTI', 'TMSI', 'IMEI' and 'IMSI'.

Additional features and advantages of the invention will be set forth in the description which follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

MODE FOR THE INVENTION

Reference will now be made in detail to the preferred embodiments of the present invention, examples of which are illustrated in the accompanying drawings. As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims. Therefore, all changes and modifications that fall within the metes and bounds of the claims, or equivalence of such metes and bounds are intended to be embraced by the appended claims.

The present invention proposes to reduce the size of data that must be transmitted in message 2 by introducing a short C-RNTI. An optimized method is provided for allocating a temporary C-RNTI in step 2 of the conventional procedure, as well as an optimized method for detecting a collision that is based not only on the initial UE identifier but also on the UE identifier type.

Figure 16:
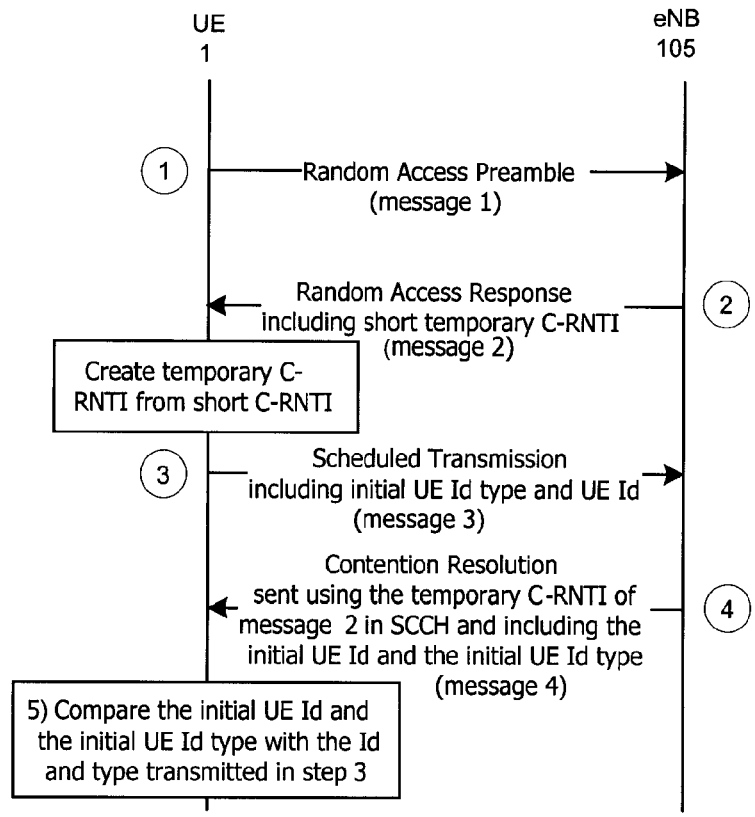
FIG. 16 illustrates a random access procedure according to the present invention.
Figure 17:
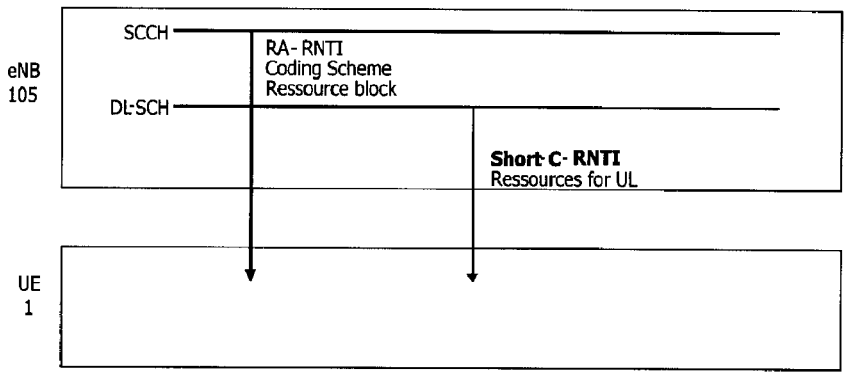
FIG. 17 illustrates optimized content of message 2 according to the present invention.

FIG. 16 illustrates a random access procedure in LTE according to the present invention. The disclosure of the present invention is directed to the procedure from the random access response (message 2) through the contention resolution (message 4) and specifically to the important parameters that are transmitted and the changes that affect the conventional procedure. FIG. 17 illustrates the optimized content of message 2 according to the present invention.

Compared to step 2 of the conventional procedure, the temporary C-RNTI is chosen from a subset of all possible C-RNTIs. This allows a reduction in the size of the data that must to be transmitted in step 2. In step 2b of FIG. 16, the UE 1 is able to reconstruct the complete C-RNTI based on the knowledge of the subset and the short C-RNTI for further use, such as in step 3 and step 4.

It is also necessary that the eNB 105 include, in step 4 of FIG. 16, not only the initial UE identifier received in step 3 but also that the eNB include the UE identifier type received in step 3 in order to ensure that the contention is resolved efficiently. The UE 1 would not only compare the UE identifier of message 4 but also the UE identifier type of message 4 with the information transmitted in message 3 in order to determine whether the access procedure was successful. Furthermore the UE identifier type can also indicate the length of the UE identifier.

Therefore it is not sufficient to compare only the initial UE identifier and it is also necessary to transmit the UE identifier type in message 4, with the UE comparing the UE identifier type and the UE identifier in order to detect whether the random access procedure has been terminated successfully or whether another random access procedure must be restarted.

Figure 1:
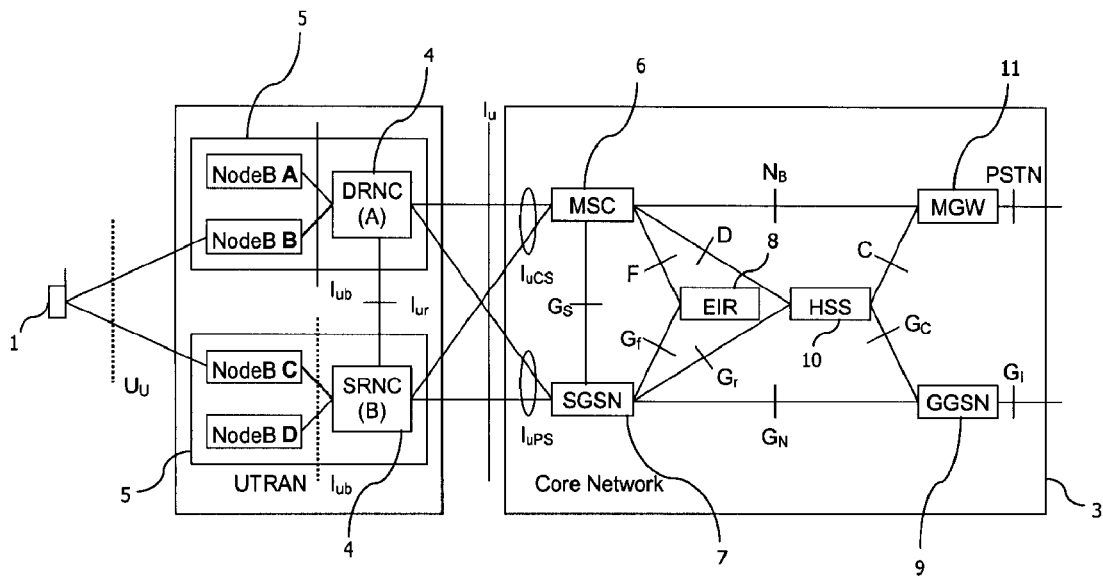
FIG. 1 illustrates an overview of a UMTS network.
Figure 2:
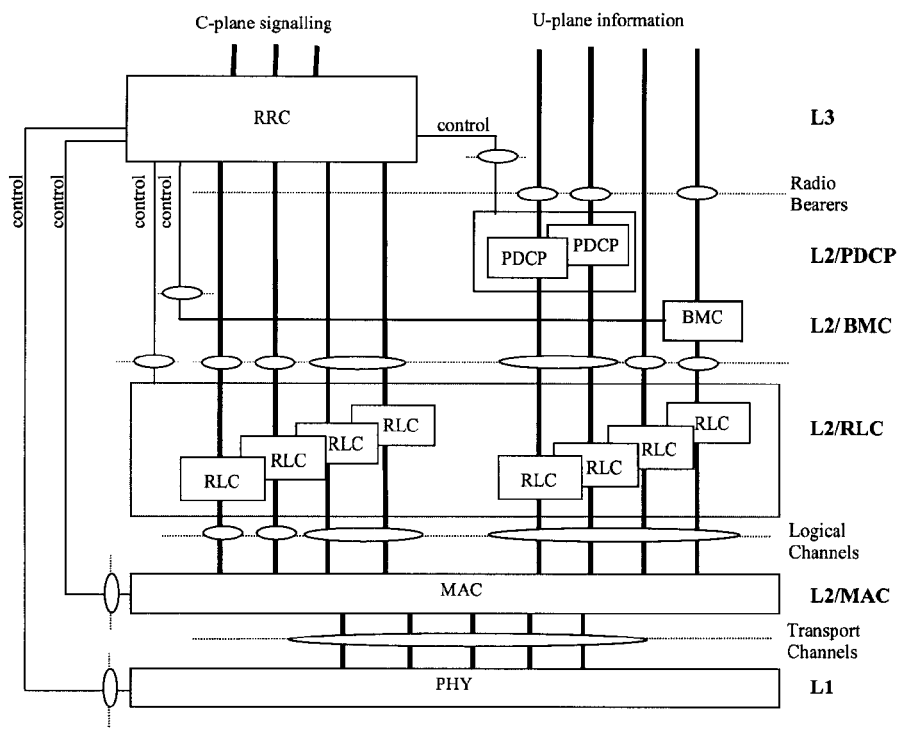
FIG. 2 illustrates a structure of a radio interface protocol between a UE and the UTRAN according to the 3GPP radio access network standards.
Figure 3:
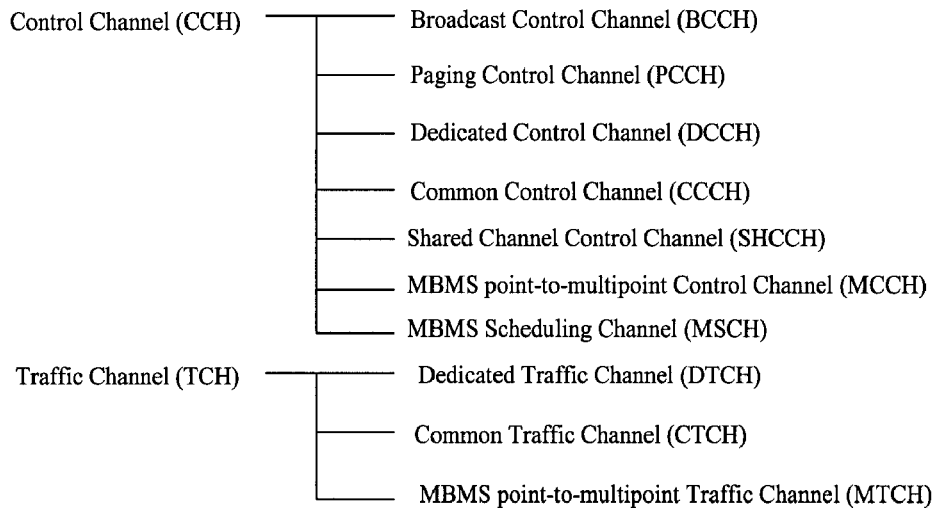
FIG. 3 illustrates the different logical channels.
Figure 4:
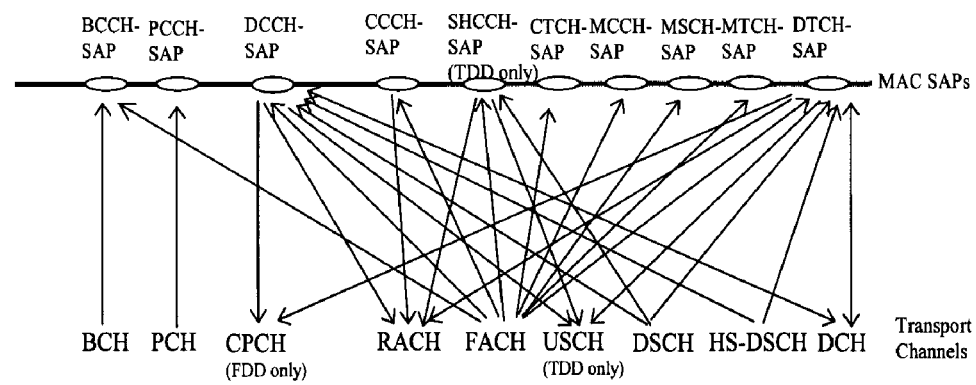
FIG. 4 illustrates logical channels mapped onto transport channels as seen from the UE side.
Figure 5:
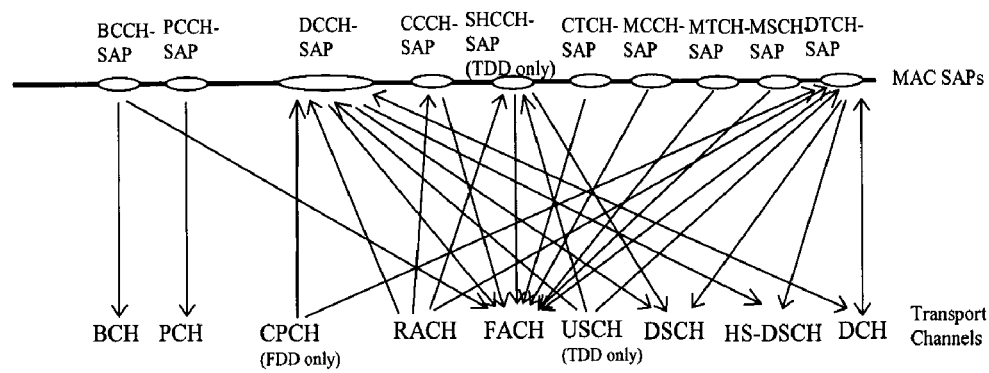
FIG. 5 illustrates logical channels mapped onto transport channels as seen from the UTRAN side.
Figure 6:
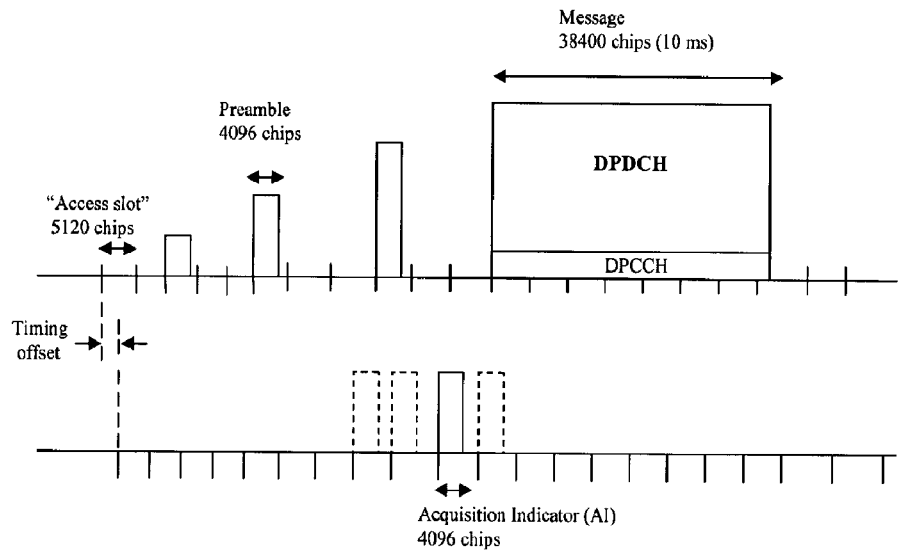
FIG. 6 illustrates a power ramping procedure.
Figure 7:
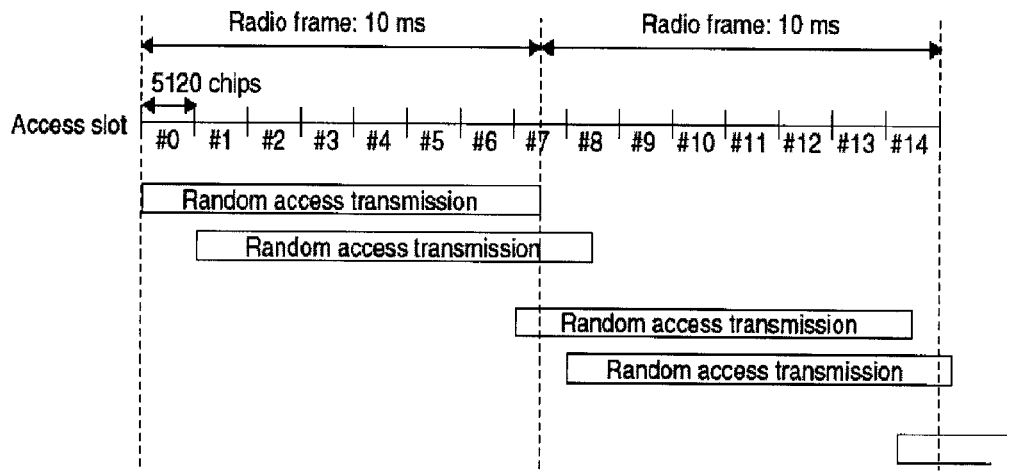
FIG. 7 illustrates the number and spacing of access slots.
Figure 8:
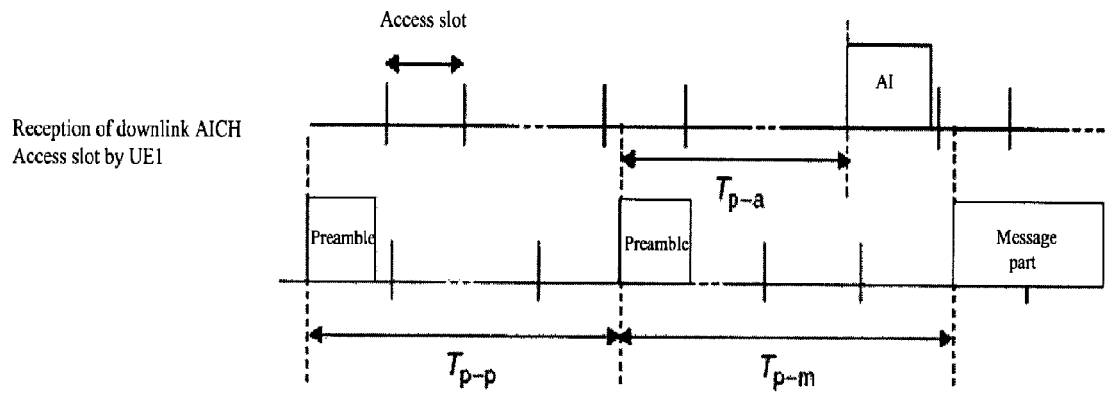
FIG. 8 illustrates the timing of the preamble, Access Indicator and message part.
Figure 9:
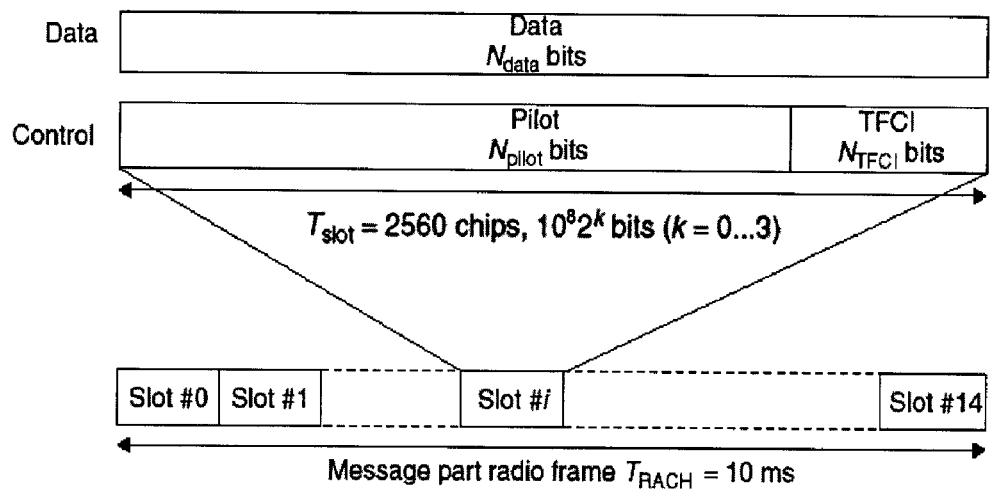
FIG. 9 illustrates the structure of the random access message part.
Figure 10:
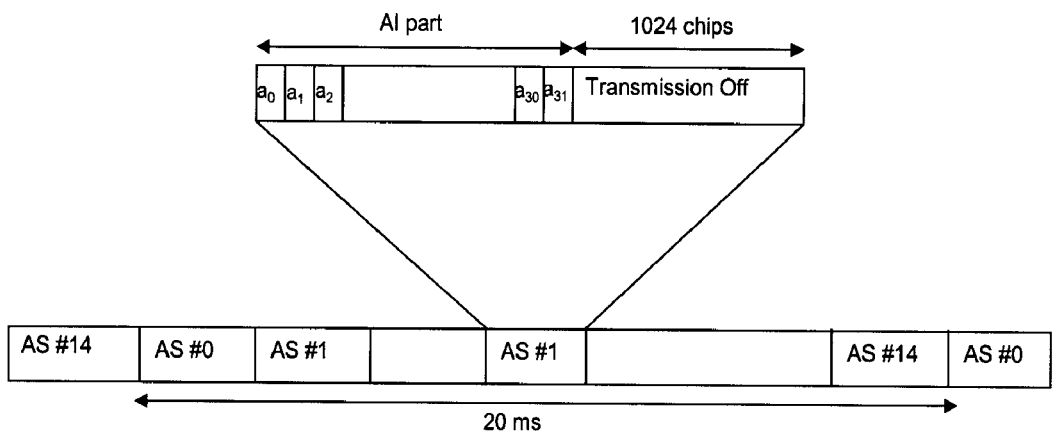
FIG. 10 illustrates the structure of the AICH.
Figure 11:
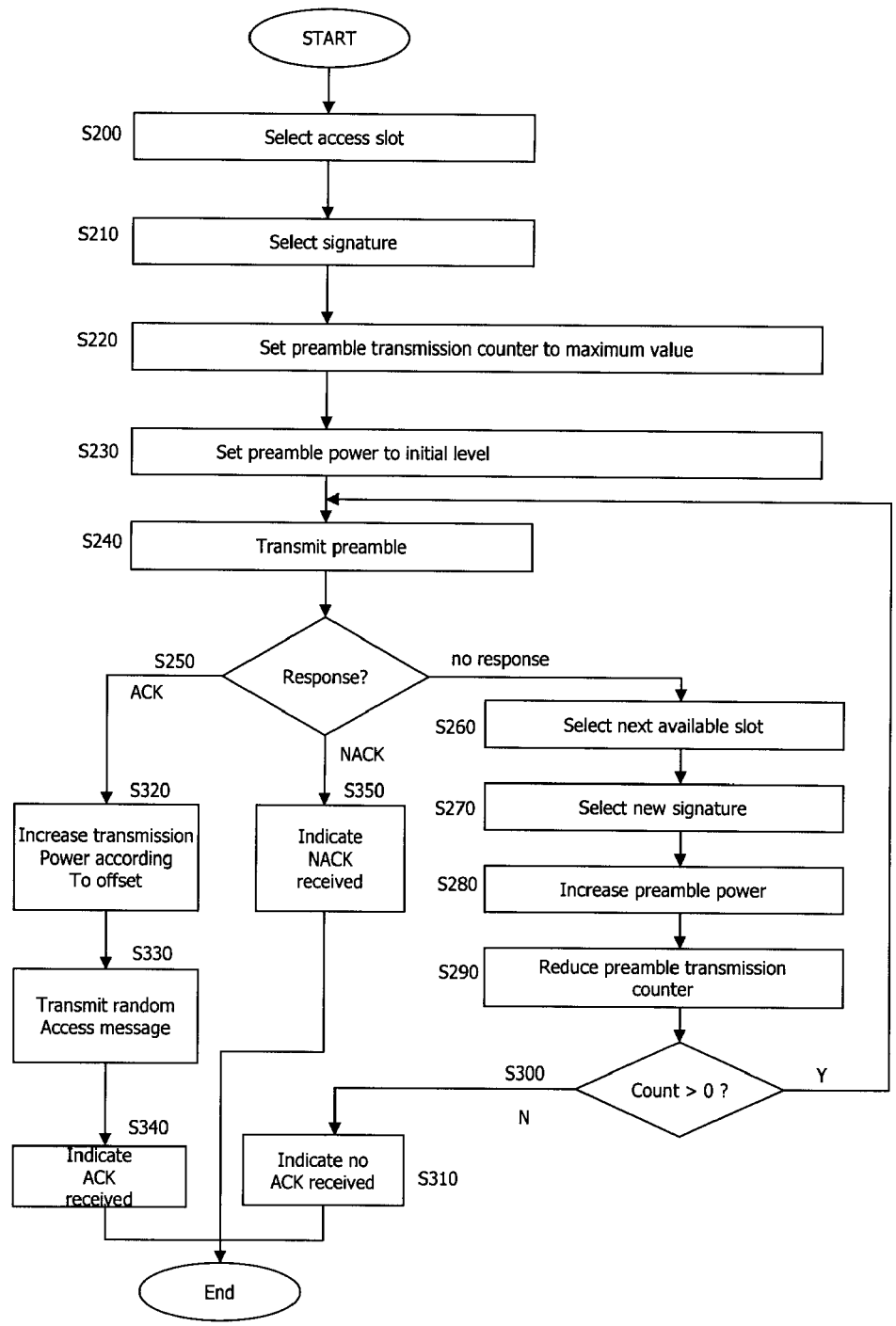
FIG. 11 illustrates a physical layer random-access procedure.
Figure 12:
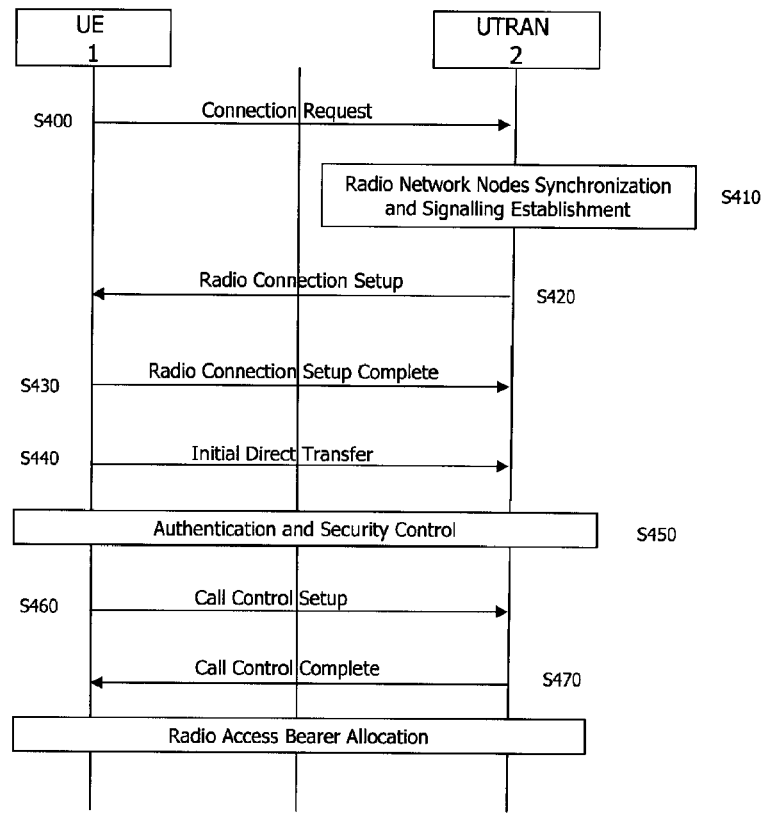
FIG. 12 illustrates a signaling establishment procedure between a UE and UTRAN.
Figure 13:
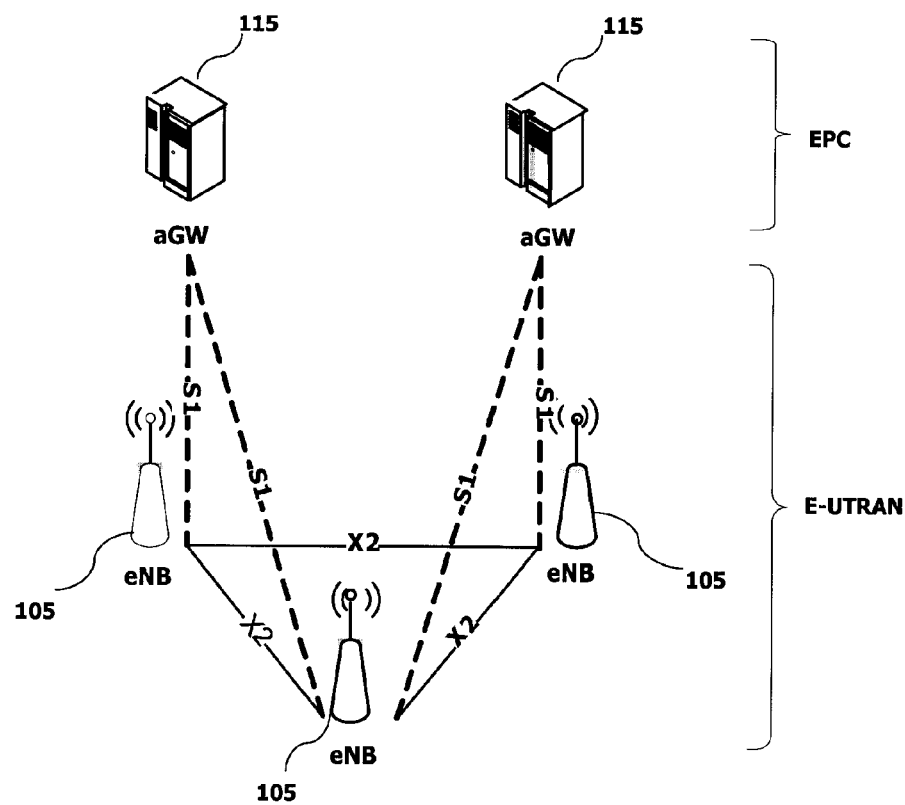
FIG. 13 illustrates an LTE system.
Figure 14:
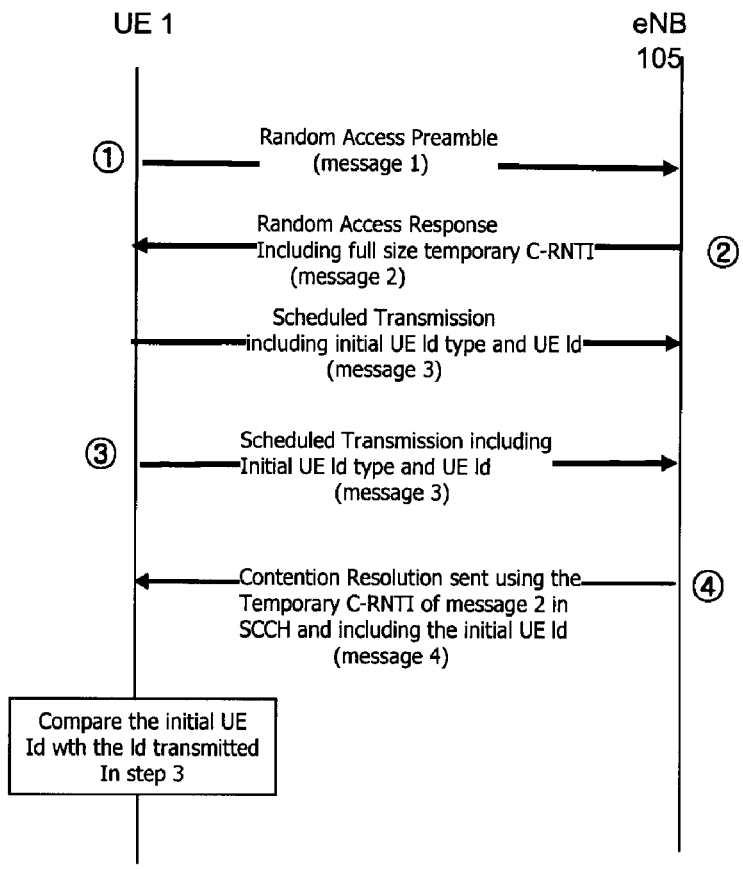
FIG. 14 illustrates a conventional random access procedure.
Figure 15:
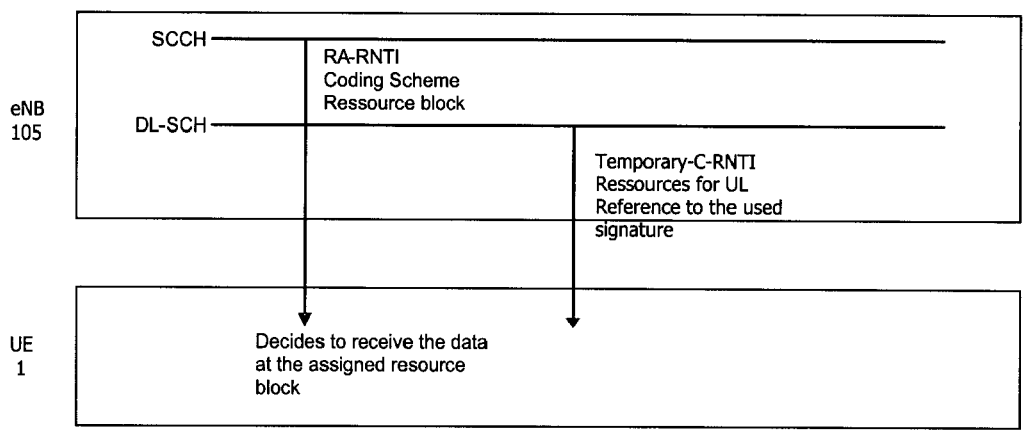
FIG. 15 illustrates assignment of a temporary C-RNTI in message 2.

The present invention proposes that a shorter Identifier, which is chosen from a subset of short C-RNTIs having a size smaller than 16 bits, is allocated to the UE 1 instead of the C-RNTI allocated in message 2 of the conventional procedure as illustrated in FIG. 14. The transmission of a short C-RNTI of less than 16 bits on DL-SCH would allow a reduction of the message 2 size and save power. For example, the size of this short C-RNTI could be 8 bits A short C-RNTI size of 8 bits would be large enough since the asynchronous RACH load would be up to 300 accesses per second and the number of UEs 1 attempting to perform RACH access between the beginning of the message 3 transmission and the receipt of message 4 by a UE can be assumed to be 300*0.1 or 30. The number of accesses per second can be estimated as 256 in order to accommodate any estimation problems and the size of the short C-RNTI can, therefore, be set to 8 bits.

A temporary C-RNTI is allocated to the UE 1 in message 2, as in the conventional random access procedure. The present invention proposes that this temporary C-RNTI is formed from the transmitted short C-RNTI according to the following formula:

$$\text{Temporary C-RNTI} = f(\text{short C-RNTI})$$

Figure 18:
FIG. 18 illustrates forming a regular C-RNTI based on a short C-RNTI according to the present invention.

The function "f" that determines how the Temporary C-RNTI is formed from the short C-RNTI could be either specified in the standard or be based on system information related to, for example, where the short C-RNTI should be mapped. Furthermore, the size of the short C-RNTI could be indicated in system information. For example, the temporary C-RNTI could consist of 8 bits, whose value would be 0, followed by the 8-bits short C-RNTI, as illustrated in FIG. 18.

The short C-RNTI allocated in message 2 would be used in step 3 for transmitting message 3 and in step 4 for transmitting message 4. The UE 1 uses the temporary C-RNTI in message 3, which is formed from the short C-RNTI, for identification purposes on the SCCH.

Figure 19:
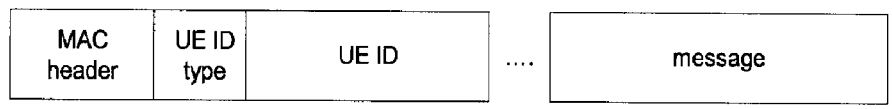
FIG. 19 illustrates the message format for message 4 according to the present invention.

Message 3 contains the initial UE 1 identity that could be either a private C-RNTI if previously allocated to the UE, a TMSI, an IMEI, an IMSI if hashing is utilized such that only a portion of the bits are used, or any other identifier that allows unique identification of the UE. Message 3 should also contain a flag indicating the type of identifier sent by the UE 1 in order to resolve contention in message 4. The message structure of message 4 would be as illustrated in FIG. 19. For example, the flag for the UE identifier type could be a 2-bits flag indicating the identifier as shown in Table VIII.

TABLE 8

| Flag (2 bits) | Identifier | Comments |
|---|---|---|
| 00 | C-RNTI | Used when the UE already has a C-RNTI |
| 01 | TMSI | |
| 10 | IMEI | Hashed |

There are two options for step 4 depending whether the UE 1 has a private C-RNTI, such as when a C-RNTI has previously been allocated to the UE. Step 4 is necessary to resolve contention in order to complete a random access procedure.

The UE 1 uses common channels. Therefore, two or more UEs 1 may perform the access procedure at the same time using the same signature, as already indicated with regard to step 1, and the information sent over the common channel by the two or more UEs may collide. The UEs 1 must wait until step 4 in order to be sure that the procedure succeeded without collision.

Figure 20:
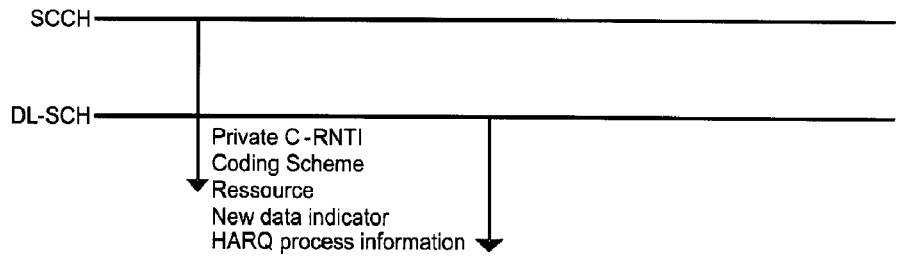
FIG. 20 illustrates transmission of message 4 for a UE that had a private C-RNTI assigned before the random access procedure according to the present invention.
Figure 21:
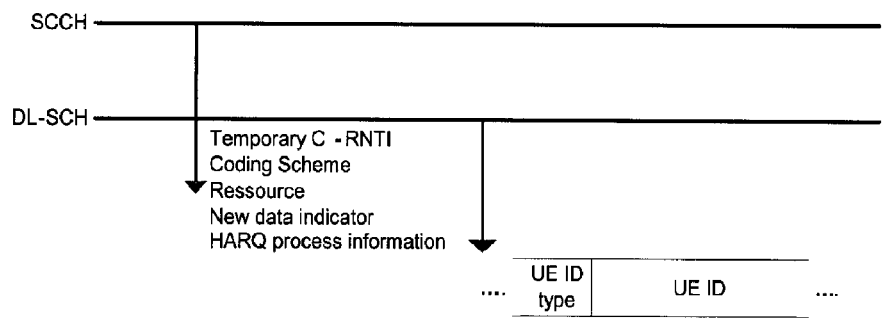
FIG. 21 illustrates transmission of message 4 for a UE that had no private C-RNTI assigned before the random access procedure according to the present invention.

FIG. 20 illustrates the case where the UE 1 has a private C-RNTI. FIG. 21 illustrates the case where the UE 1 doesn't have a private C-RNTI.

As illustrated in FIG. 20, the UE identifier transmitted on SCCH is the private C-RNTI. The UE 1 only has to compare this private C-RNTI transmitted on SCCH with its private C-RNTI since the private C-RNTI is unique and its value can't be equal to any of the temporary C-RNTI values in step 2.

The random access procedure is successful if the private C-RNTI transmitted on SCCH matches the UE 1 private C-RNTI. Therefore, the message transmitted on the DL-SCH need not include the UE identifier type and can contain only the data.

As illustrated in FIG. 21, the UE 1 identifier transmitted on SCCH is the temporary C-RNTI. The message transmitted on the DL-SCH must contain the UE identifier type, as described previously for step 3, and the UE identifier.

The UE 1 must know if it has succeeded in the random access procedure in order to resolve contention, or in other words, to ensure that all the messages it receives are intended for it and not designated for another UE that has used the same signature in step 1. This requires the UE 1 to compare the UE identifier type and UE identifier fields in the received message 4 to the UE identifier type and UE identifier fields that the UE sent in message 3.

The UE 1 knows that the random access procedure is successful if the UE identifier type and UE identifier match. The UE 1 must perform the random access procedure again from step 1 if UE identifier type and UE identifier do not match.

Figure 22:
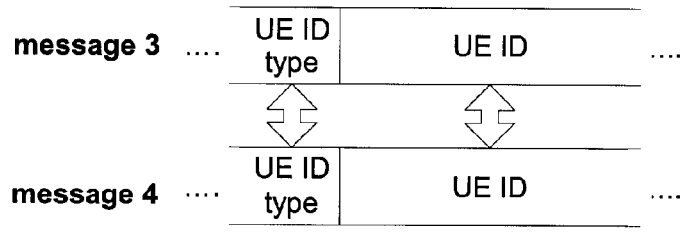
FIG. 22 illustrates collision detection with message 4 according to the present invention.

The transmission of the UE identifier type in message 4 is important because it is possible that two UEs 1 use different UE identifiers having the same value and comparing only the UE identifier would not resolve contention. Therefore, the inclusion of the UE identifier in message 4 is important to provide collision detection, as illustrated in FIG. 22. Of course, the UE identifier transmitted in message 4 will be of the same type as the UE identifier received by the e-Nb in message 3.

When the UE 1 does not have a private C-RNTI, as illustrated in FIG. 21, it should be allocated to the UE in message 4 during step 4. If the UE 1 has used a temporary C-RNTI based on a short C-RNTI, the eNB 105 could either allocate another C-RNTI that is not contained in the sets of C-RNTIs that can be formed from a short C-RNTI or the eNB could indicate that the temporary C-RNTI formed based on the temporary C-RNTI can be kept by the UE.

Figure 23:
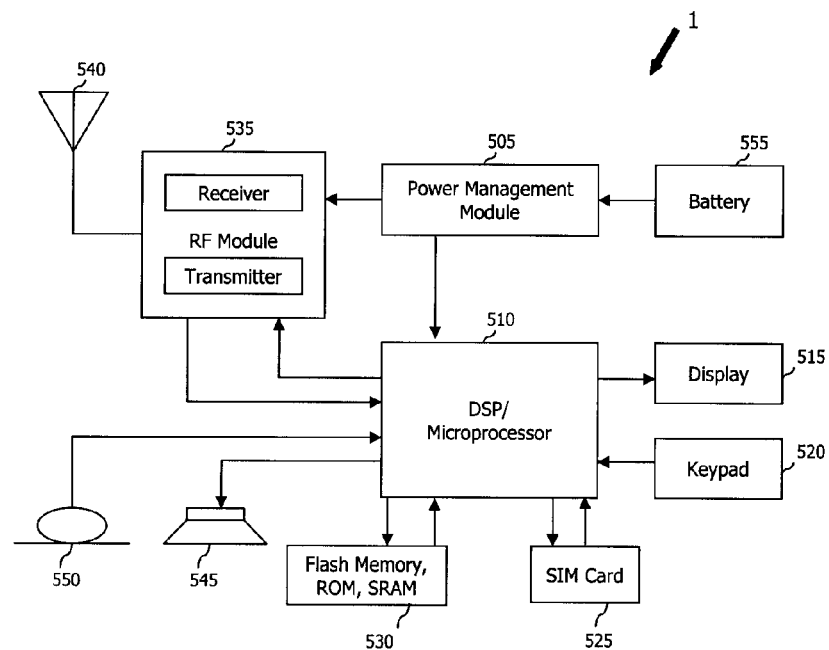
FIG. 23 illustrates a block diagram of a mobile terminal according to the present invention.

FIG. 23 illustrates a block diagram of a mobile station (MS) or UE 1. The UE 1 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The foregoing embodiments and advantages are merely exemplary and are not to be construed as limiting the present invention. The present teaching can be readily applied to other types of apparatuses.

The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

The invention claimed is:

1. A method of a mobile terminal for establishing a communication link between the mobile terminal and a network, the method comprising:
   transmitting, from the mobile terminal, a random access request to the network for initiating a random access procedure to establish the communication link between the mobile terminal and the network;
   receiving a random access response acknowledging receipt of the random access request, the random access response comprising a short mobile terminal identifier, wherein the short mobile terminal identifier is selected from a subset of short C-RNTIs (Cell-Radio Network Temporary Identifier) having a size smaller than 16 bits, wherein a size of the short C-RNTI is indicated by system information;

forming, at the mobile terminal, a mobile terminal identifier from the short mobile terminal identifier comprised in the received random access response, wherein the mobile terminal identifier is a C-RNTI that provides a unique mobile terminal identification at a cell level; and transmitting, from the mobile terminal, a scheduled uplink data and the formed mobile terminal identifier to the network.

2. The method of claim 1, wherein the size of the short C-RNTI is 8-bits.

3. The method of claim 1, wherein the short mobile terminal identifier is appended at a least significant bit (LSB) of the mobile terminal identifier.

4. A method of a network for establishing a communication link between a mobile terminal and the network, the method comprising:

receiving, by the network, a random access request for initiating a random access procedure to establish the communication link between the mobile terminal and the network;

transmitting, by the network, a random access response acknowledging receipt of the random access request to the mobile terminal, the random access response comprising a short mobile terminal identifier, wherein the short mobile terminal identifier is selected from a subset of short C-RNTIs (Cell-Radio Network Temporary Identifier) having a size smaller than 16 bits, wherein a size of the short C-RNTI is indicated by system information, wherein a mobile terminal identifier is formed from the short mobile terminal identifier, and the mobile terminal identifier is a C-RNTI that provides a unique mobile terminal identification at a cell level; and receiving, by the network, a scheduled uplink data and the formed mobile terminal identifier.

5. A mobile terminal for establishing a communication link between the mobile terminal and a network, the mobile terminal comprising:

a transmitting unit that transmits a random access request to the network for initiating a random access procedure to establish the communication link between the mobile terminal and the network;

a receiving unit that receives a random access response acknowledging receipt of the random access request, the random access response comprising a short mobile terminal identifier, wherein the short mobile terminal identifier is selected from a subset of short C-RNTIs (Cell-Radio Network Temporary Identifier) having a size smaller than 16 bits, wherein a size of the short C-RNTI is indicated by system information;

a display unit that displays visual information;

an input unit that receives inputs; and a processing unit that forms a mobile terminal identifier from the short mobile terminal identifier comprised in the received random access response, wherein the mobile terminal identifier is a C-RNTI that provides a unique mobile terminal identification at a cell level, wherein the transmitting unit further transmits a scheduled uplink data and the formed mobile terminal identifier to the network.

6. The mobile terminal of claim 5, wherein the short mobile terminal identifier is appended at a least significant bit (LSB) of the mobile terminal identifier.

7. A network for establishing a communication link with a mobile terminal, the network comprising:

a receiver that receives a random access request for initiating a random access procedure to establish the communication link between the mobile terminal and the network; and a transmitter that transmits a random access response acknowledging receipt of the random access request, the random access response comprising a short mobile terminal identifier, wherein the short mobile terminal identifier is selected from a subset of short C-RNTIs (Cell-Radio Network Temporary Identifier) having a size smaller than 16 bits, wherein a size of the short C-RNTI is indicated by system information, wherein a mobile terminal identifier is formed from the short mobile terminal identifier, and the mobile terminal identifier is a C-RNTI that provides a unique mobile terminal identification at a cell level, wherein the receiver further receives a scheduled uplink data and the mobile terminal identifier.

8. The network of claim 7, wherein the short mobile terminal identifier is appended at a least significant bit (LSB) of the selected mobile terminal identifier.

* * * * *